United States Patent [19]

Song et al.

[11] Patent Number: 5,614,234

[45] Date of Patent: Mar. 25, 1997

[54] TOTAL CHEWING GUM MANUFACTURE USING HIGH EFFICIENCY CONTINUOUS MIXING

[75] Inventors: Joo H. Song, Northbrook; Christafor E. Sundstrom, Glen Ellyn; David W. Record, River Forest; Donald J. Townsend, Chicago; Kevin B. Broderick, Berwyn; Philip G. Schnell, Downers Grove, all of Ill.

[73] Assignee: Wm. Wrigley Jr. Company, Chicago, Ill.

[21] Appl. No.: 526,888

[22] Filed: Sep. 12, 1995

Related U.S. Application Data

[63] Continuation-in-part of Ser. No. 362,254, Dec. 22, 1994, Pat. No. 5,543,160, which is a continuation-in-part of Ser. No. 305,363, Sep. 13, 1994, abandoned.

[51] Int. Cl.⁶ ................................................. A23G 3/30
[52] U.S. Cl. ........................................................ 426/5
[58] Field of Search ............................ 426/3–6, 516; 425/204, 208

[56] References Cited

U.S. PATENT DOCUMENTS

| H1,241 | 10/1993 | Synosky et al. | 426/3 |
|---|---|---|---|
| 1,855,017 | 4/1932 | Geller | 426/3 |
| 1,887,930 | 11/1932 | Hatherell | 426/3 |
| 2,123,531 | 7/1938 | Hatherell | 99/135 |
| 2,125,562 | 8/1938 | Hatherell | 99/135 |
| 2,197,240 | 4/1940 | Hatherell | 99/135 |
| 2,284,804 | 6/1942 | De Angelis | 99/135 |
| 2,288,100 | 6/1942 | Manson | 99/135 |
| 2,383,145 | 8/1945 | Moose | 99/135 |
| 2,468,393 | 4/1949 | Corkery et al. | 99/135 |
| 3,618,902 | 11/1969 | Brennan, Jr. et al. | 259/6 |
| 3,984,574 | 10/1976 | Comollo | 426/4 |
| 3,995,064 | 11/1976 | Ehrgott et al. | 426/3 |
| 4,187,320 | 2/1980 | Koch et al. | 426/3 |
| 4,202,906 | 5/1980 | Ogawa et al. | 426/3 |
| 4,217,368 | 8/1980 | Witzel et al. | 426/5 |
| 4,224,345 | 9/1980 | Tezuka et al. | 426/3 |
| 4,252,830 | 2/1981 | Kehoe et al. | 426/5 |
| 4,254,148 | 3/1981 | Ogawa et al. | 426/3 |
| 4,305,962 | 12/1981 | del Angel | 426/3 |
| 4,352,822 | 10/1982 | Cherukuri et al. | 426/4 |
| 4,357,354 | 11/1982 | Kehoe et al. | 426/3 |
| 4,379,169 | 4/1983 | Reggio et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |
| 4,459,311 | 7/1984 | De Tora et al. | 426/3 |
| 4,490,395 | 12/1984 | Cherukuri et al. | 426/3 |

(List continued on next page.)

FOREIGN PATENT DOCUMENTS

| 0273809 | 12/1987 | European Pat. Off. | A23G 3/30 |
|---|---|---|---|
| 0524902 | 7/1992 | European Pat. Off. | A23G 3/30 |
| 2635441 | 8/1988 | France | A23G 3/30 |
| 1538785 | 1/1979 | United Kingdom | C08J 3/20 |
| 2049705 | 12/1980 | United Kingdom | C08J 3/20 |
| WO95/08272 | 3/1995 | WIPO | A23G 3/30 |
| WO95/10947 | 4/1995 | WIPO | A23G 3/30 |
| WO95/10194 | 4/1995 | WIPO | A23G 3/30 |
| WO95/10948 | 4/1995 | WIPO | A23G 3/30 |

OTHER PUBLICATIONS

"Leistritz Extrusionstechnik: The Multi–Extrusion System for Mixing, Kneading And Strandextrusion", by American Leistriz Extruder Corp. (Undated).

"Buss Technology For The Continuous Compounding Of Gum Base", by George Fischer of Buss Gruppe (Apr. 22, 1995).

(List continued on next page.)

*Primary Examiner*—Jeanette Hunter
*Attorney, Agent, or Firm*—Hill, Steadman & Simpson

[57] ABSTRACT

A method is provided for the total manufacture of chewing gum on a continuous basis. The method uses a continuous high efficiency mixer which is configured for the total manufacture of a wide variety of chewing gum products. Pursuant to the method, glycerin is added at an early point in the mixer.

19 Claims, 5 Drawing Sheets

U.S. PATENT DOCUMENTS

| | | |
|---|---|---|
| 4,514,423 | 4/1985 | Tezuka et al. .............................. 426/3 |
| 4,515,769 | 5/1985 | Marritt et al. ............................ 424/49 |
| 4,555,407 | 11/1985 | Kramer et al. ............................. 426/5 |
| 4,590,075 | 5/1986 | Wei et al. .................................. 426/5 |
| 4,711,784 | 12/1987 | Yang ......................................... 426/5 |
| 4,721,620 | 1/1988 | Cherukie et al. .......................... 426/6 |
| 4,738,854 | 4/1988 | Friello et al.. ............................. 426/3 |
| 4,740,376 | 4/1988 | Yang ......................................... 426/5 |
| 4,794,003 | 12/1988 | Cherukuri et al. ......................... 426/6 |
| 4,816,265 | 3/1989 | Cherukuri et al. ......................... 426/3 |
| 4,850,842 | 7/1989 | Van Alstine ............................ 425/205 |
| 4,872,884 | 10/1989 | Cherukuri et al. ......................... 426/3 |
| 4,876,095 | 10/1989 | Yang ......................................... 426/3 |
| 4,882,172 | 11/1989 | Van Alstine ............................ 425/113 |
| 4,933,189 | 6/1990 | Cherukuri et al. ......................... 426/3 |
| 4,940,594 | 7/1990 | Van Alstine ............................ 426/231 |
| 4,968,511 | 11/1990 | D'Amelia et al. ......................... 426/6 |
| 4,992,280 | 2/1991 | Chu et al. .................................. 426/5 |
| 5,023,093 | 6/1991 | Cherukuri et al. ......................... 426/3 |
| 5,045,325 | 9/1991 | Lesko et al. ............................... 426/5 |
| 5,059,103 | 10/1991 | Bruckmann et al. ..................... 425/67 |
| 5,075,291 | 12/1991 | DuRoss .................................... 514/60 |
| 5,110,607 | 5/1992 | Yang ......................................... 426/3 |
| 5,135,760 | 8/1992 | Degady et al. ............................. 426/5 |
| 5,158,789 | 10/1992 | DuRoss ..................................... 426/3 |
| 5,229,148 | 7/1993 | Couper .................................... 476/502 |
| 5,324,530 | 6/1994 | Kehoe et al. ........................... 426/516 |
| 5,397,580 | 3/1995 | Song et al. ................................. 426/5 |
| 5,413,799 | 5/1995 | Song et al. ................................. 426/3 |
| 5,415,880 | 5/1995 | Song et al. ................................. 426/3 |
| 5,419,919 | 5/1995 | Song et al. ................................. 478/5 |
| 5,543,160 | 8/1996 | Song et al. ................................. 426/3 |

OTHER PUBLICATIONS

"Buss Technology For The Continuous Compounding Of Chewing Gum And Bubble Gum", by Bernd Rose of Buss Gruppe (Apr. 24, 1995).

"Rubber Extrusion Technology", Feb. 1993, including page entitled Mixing In Extruders.

"The Teledyne Readco Continuous Processor", by Teledyne Readco Co. (Date unknown).

"Extrusion: Does Chewing Gum Pass The Taste Test?", *Food Manufacture,* Sep. 1987, pp. 47–50.

"Mixing Process Used In The Manufacture Of Chewing Gum", R. Schilling, Werner & Pfleidener Co. (Date unknown).

Letter dated Aug. 22, 1989, including attachment entitled "Buss Extrusion Technology" (1989).

"D–Tex Continuous Compounding Twin Screw Extruders", Davis–Standard Co. (Undated).

"Farrell–Rockstedt Twin–Screw Extruders", by Farrell Corp. (Undated).

"Leistritz Extrusionstechnik: The Universal Laboratory System", by American Leistritz Extruder Corp. (Undated).

Buss, Nov. 87, "Extrusion Processing Of Shear–Sensitive Food Products", by Dr. Treiber of Buss AG (Switzerland).

"Buss Extrusion Technology", Advertising brochure by Buss America Inc. (Date unknown).

J. Agric. Food Chem. 1991, 39, 1063–1069, "Thermal Decomposition of Some Phenolic Antioxidants", by (Hamama).

Ingredients Extra, Jun. 1994, vol. 7, No. 2 Supplement, "Extrusion Technology For Chewing Gum Production", by (Haarman & Reimer, The Netherlands).

"Buss Kneading Extruder Technology for the Food Industry", Advertising brochure by Buss America Inc. (Date unknown).

U.S. Patent Application Serial No. 08/126,319, filed Sep. 24, 1993 entitled "Continuous Chewing Gum Base Manufacturing Process Using Highly Distributive Mixing", Inventors Song et al.

U.S. Patent Application Serial No. 08/136,589, filed Oct. 14, 1993, entitled "Continuous Chewing Gum Base Manufacturing Process Using A mixing–Restriction Element", Inventors Song, et al.

U.S. Patent Application Serial No. 08/141m281, filed Oct. 22, 1993, entitled "Continuous Gum Base Manufacture Using Paddle Mixing", Inventors Song et al.

U.S. Patent Application Serial No. 08/305,363, filed Sep. 13, 1994 entitled "Total Chewing Gum Manufacture Using High Efficiency Continuous Mixing", Inventors Song, et al.

TOTAL CHEWING GUM MANUFACTURE USING HIGH EFFICIENCY CONTINUOUS MIXING

RELATED APPLICATIONS

This application is a continuation-in-part of U.S. application Ser. No. 08/362,254, filed on Dec. 22, 1994 now U.S. Pat. No. 5,543,160, which is a continuation-in-part of U.S. application Ser. No. 08/305,363, filed on Sep. 13, 1994, now abandoned.

FIELD OF THE INVENTION

This invention is a process for the total manufacture of chewing gum base and chewing gum using a single high efficiency continuous mixer.

BACKGROUND OF THE INVENTION

Conventionally, chewing gum base and chewing gum product have been manufactured using separate mixers, different mixing technologies and, often, at different factories. One reason for this is that the optimum conditions for manufacturing gum base, and for manufacturing chewing gum from gum base and other ingredients such as sweeteners and flavors, are so different that it has been impractical to integrate both tasks. Chewing gum base manufacture, on the one hand, involves the dispersive (often high shear) mixing of difficult-to-blend ingredients such as elastomer, filler, elastomer plasticizer, base softeners/emulsifiers and, sometimes wax, and typically requires long mixing times. Chewing gum product manufacture, on the other hand, involves combining the gum base with more delicate ingredients such as product softeners, bulk sweeteners, high intensity sweeteners and flavoring agents using distributive (generally lower shear) mixing, for shorter periods.

In order to improve the efficiency of gum base and gum product manufacture, there has been a trend toward the continuous manufacture of chewing gum bases and products. U.S. Pat. No. 3,995,064, issued to Ehrgott et al., discloses the continuous manufacture of gum base using a sequence of mixers or a single variable mixer. U.S. Pat. No. 4,459,311, issued to DeTora et al., also discloses the continuous manufacture of gum base using a sequence of mixers. Other continuous gum base manufacturing processes are disclosed in European Publication No. 0,273,809 (General Foods France) and in French Publication No. 2,635,441 (General Foods France).

U.S. Pat. No. 5,045,325, issued to Lesko et al., and U.S. Pat. No. 4,555,407, issued to Kramer et al., disclose processes for the continuous production of chewing gum products. In each case, however, the gum base is initially prepared separately and is simply added into the process. U.S. Pat. No. 4,968,511, issued to D'Amelia et al., discloses a chewing gum product containing certain vinyl polymers which can be produced in a direct one-step process not requiring separate manufacture of gum base. However, the disclosure focuses on batch mixing processes not having the efficiency and product consistency achieved with continuous mixing. Also, the single-step processes are limited to chewing gums containing unconventional bases which lack elastomers and other critical ingredients.

In order to simplify and minimize the cost of chewing gum manufacture, there is need or desire in the chewing gum industry for an integrated continuous manufacturing process having the ability to combine chewing gum base ingredients and other chewing gum ingredients in a single mixer, which can be used to manufacture a wide variety of chewing gums.

One problem that is encountered in manufacturing chewing gum is the creation of sorbitol spots on the chewing gum. An additional problem in chewing gums that include glycerin is that phase separation can occur because the glycerin is not fully incorporated in the chewing gum.

SUMMARY OF THE INVENTION

The present invention is a method for the manufacture of a wide variety of chewing gum products using high efficiency mixers.

Pursuant to the present invention, glycerin is added to the high efficiency mixer at an early point in the process. If desired, the glycerin is added at two or more locations in the mixer. It has been found that the early addition of glycerin prevents sorbitol spots and phase separation by completely incorporating the glycerin into the gum formula. Further, by adding glycerin early, the texture of the gum during post-processing and during the chew may be improved.

Preferably, the method includes the use of a high efficiency continuous mixer.

A high efficiency continuous mixer is one which is capable of providing thorough mixing over a relatively short distance or length of the mixer. This distance is expressed as a ratio of the length of a particular active region of the mixer screw, which is composed of mixing elements, divided by the maximum diameter of the mixer barrel in this active region. In an embodiment, the method of the invention comprises performing the following mixing steps in a single continuous mixer:

a) adding and thoroughly mixing at least a portion of the chewing gum base ingredients (elastomer, elastomer plasticizer, filler, etc.) in a continuous mixer, using an L/D of not more than about 25;

b) adding at least a portion of the remaining (non-base) chewing gum ingredients (sweeteners, flavors, softeners, etc.), and thoroughly mixing these ingredients with the gum base in the same mixer, using an L/D of not more than about 15; and c) sufficiently completing the entire addition and mixing operation in the same mixer, so that the ingredients exist as a substantially homogeneous chewing gum mass, using a total L/D of not more than about 40.

It is preferred that the gum base ingredients be completely added and mixed upstream from at least most of the remaining chewing gum ingredients, and that the remaining ingredients be completely added downstream for mixing with the already blended gum base. However, the invention also includes those variations wherein a portion of the gum base ingredients may be added downstream with or after some of the remaining ingredients, and/or wherein a portion of the remaining (non-base) ingredients are added upstream with or before some of the base ingredients. In an embodiment, a substantially homogenous chewing gum product mass is formed in a single continuous mixer, using an L/D of not more than about 40, without requiring a separate mixer to manufacture the chewing gum base.

With the foregoing in mind, it is an advantage of the invention to provide a continuous method for manufacturing chewing gum which does not require a separate manufacture of chewing gum base.

It is an advantage of the invention to provide a process for making chewing gum that prevents sorbitol spots on the chewing gum.

It is an advantage of the invention to provide a method that prevents phase separation and completely incorporates the glycerin into the chewing gum.

It is an advantage of the invention to provide a method that improves the texture of the chewing gum.

It is also an advantage of the invention to provide a continuous method for making chewing gum which accomplishes every essential mixing step using a single mixer.

It is also an advantage of the invention to provide a continuous method for making chewing gum which requires less equipment, less capital investment, and less labor than conventional manufacturing methods.

It is also an advantage of the invention to provide a continuous manufacturing method that produces chewing gum having greater product consistency, less thermal degradation, less thermal history, and less contamination than chewing gum produced using conventional processes that require longer manufacturing times and more manufacturing steps.

The foregoing and other features and advantages of the invention will become further apparent from the following detailed description of the presently preferred embodiments, read in conjunction with the accompanying examples and drawings. The detailed description, examples and drawings are intended to be merely illustrative rather than limiting, the scope of the invention being defined by the appended claims and equivalents thereof.

DETAILED DESCRIPTION OF THE PRESENTLY PREFERRED EMBODIMENTS

The present invention provides methods for the manufacture of chewing gum, using a continuous high-efficiency mixer. In an embodiment, the method allows the manufacture of chewing gum without requiring the separate manufacture of chewing gum base.

As set forth in more detail below, the present invention provides a method for manufacturing chewing gum on a continuous basis. Pursuant to the present invention, glycerin is added at an early point in the process. The inventors have found that this results in the prevention of sorbitol spots and phase separation by completely incorporating the glycerin into the gum formulation. Additionally, by adding the glycerin early, the texture of the chewing gum during post-processing and during the chew may be improved.

The methods of the present invention can be advantageously performed using a continuous mixer whose mixing screw is composed primarily of precisely arranged mixing elements with only a minor fraction of simple conveying elements. A presently preferred mixer is a blade-and-pin mixer exemplified in FIG. 1. A blade-and-pin mixer uses a combination of selectively configured rotating mixer blades and stationary barrel pins to provide efficient mixing over a relatively short distance. A commercially available blade-and-pin mixer is the Buss kneader, manufactured by Buss AG in Switzerland, and available from Buss America, located in Bloomingdale, Ill.

Figure 1:
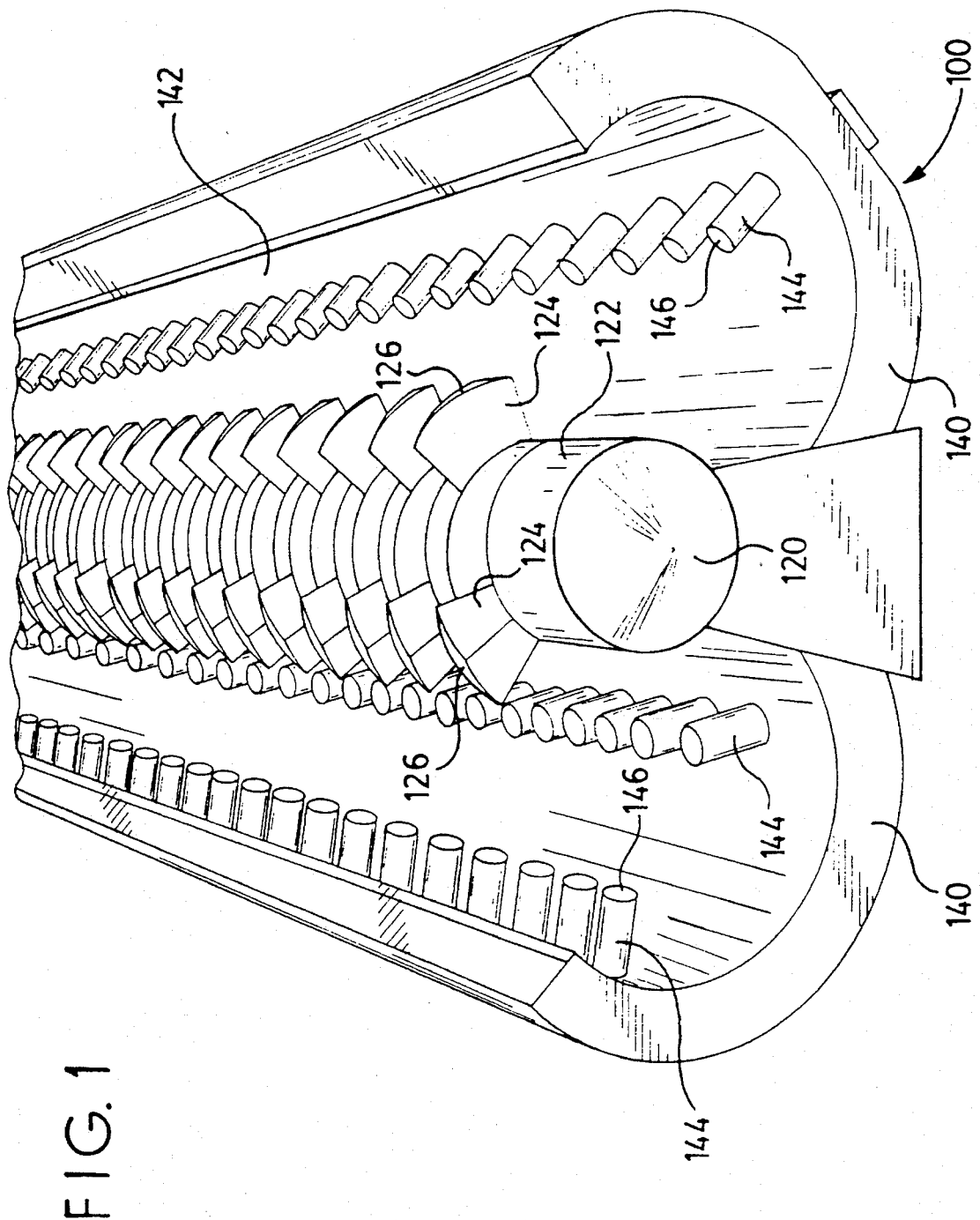
FIG. 1 is a partial exploded perspective view of a Buss high efficiency mixer used to practice the method of the invention, illustrating a mixing barrel and mixing screw arrangement.

Referring to FIG. 1, a presently preferred blade-and-pin mixer 100 includes a single mixing screw 120 turning inside a barrel 140 which, during use, is generally closed and completely surrounds the mixing screw 120. The mixing screw 120 includes a generally cylindrical shaft 122 and three rows of mixing blades 124 arranged at evenly spaced locations around the screw shaft 122 (with only two of the rows being visible in FIG. 1). The mixing blades 124 protrude radially outward from the shaft 122, with each one resembling the blade of an axe.

The mixing barrel 140 includes an inner barrel housing 142 which is generally cylindrical when the barrel 140 is closed around the screw 120 during operation of the mixer 100. Three rows of stationary pins 144 are arranged at evenly spaced locations around the screw shaft 142, and protrude radially inward from the barrel housing 142. The pins 144 are generally cylindrical in shape, and may have rounded or bevelled ends 146.

The mixing screw 120 with blades 124 rotates inside the barrel 140 and is driven by a variable speed motor (not shown). During rotation, the mixing screw 120 also moves back and forth in an axial direction, creating a combination of rotational and axial mixing which is highly efficient. During mixing, the mixing blades 124 continually pass between the stationary pins 144, yet the blades and the pins never touch each other. Also, the radial edges 126 of the blades 124 never touch the barrel inner surface 142, and the ends 146 of the pins 144 never touch the mixing screw shaft 122.

FIGS. 2–6 illustrate various screw elements which can be used to configure the mixing screw 120 for optimum use. FIGS. 2A and 2B illustrate on-screw elements 20 and 21 which are used in conjunction with a restriction ring assembly. The on-screw elements 20 and 21 each include a cylindrical outer surface 22, a plurality of blades 24 projecting outward from the surface 22, and an inner opening 26 with a keyway 28 for receiving and engaging a mixing screw shaft (not shown). The second on-screw element 21 is about twice as long as the first on-screw element 20.

Figure 2A:
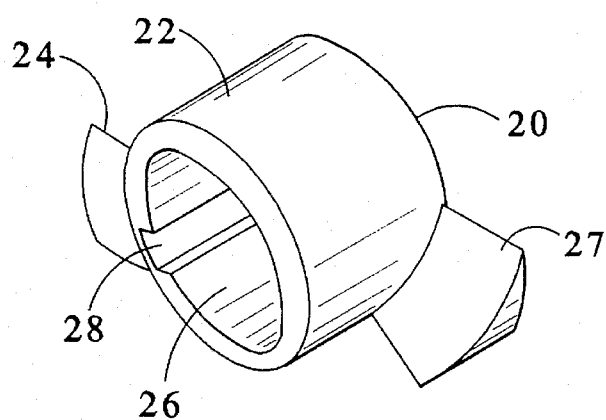
FIG. 2A is a perspective view of an on-screw element used on the upstream side of a restriction ring assembly, in the high efficiency mixer configuration.
Figure 2B:
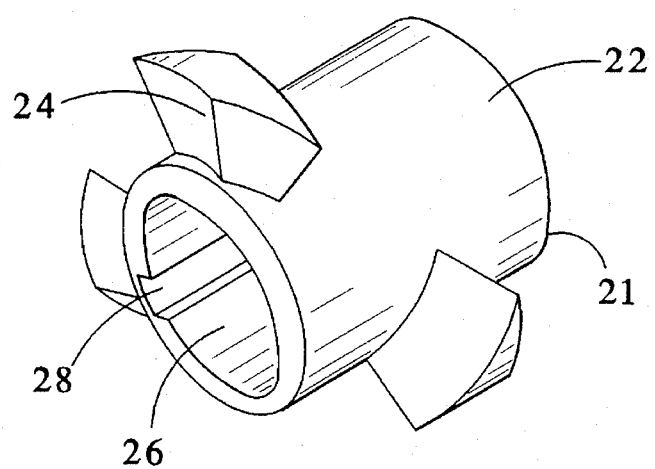
FIG. 2B is a perspective view of an on-screw element used on the downstream side of the restriction ring assembly in the high efficiency mixer configuration.
Figure 2C:
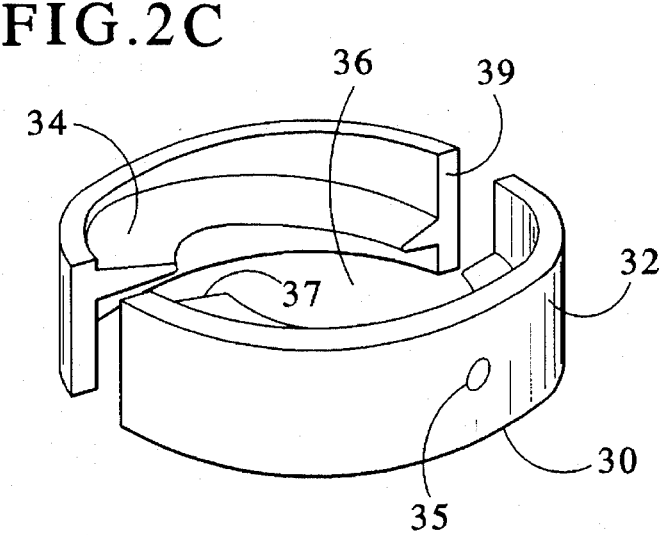
FIG. 2C is a perspective view of a restriction ring assembly used in the high efficiency mixer configuration.

FIG. 2C illustrates a restriction ring assembly 30 used to build back pressure at selected locations along the mixing screw 120. The restriction ring assembly 30 includes two halves 37 and 39 mounted to the barrel housing 142, which halves engage during use to form a closed ring. The restriction ring assembly 30 includes a circular outer rim 32, an inner ring 34 angled as shown, and an opening 36 in the inner ring which receives, but does not touch, the on-screw elements 20 and 21 mounted to the screw shaft. Mounting openings 35 in the surface 32 of both halves of the restriction ring assembly 30 are used to mount the halves to the barrel housing 142.

Figure 3:
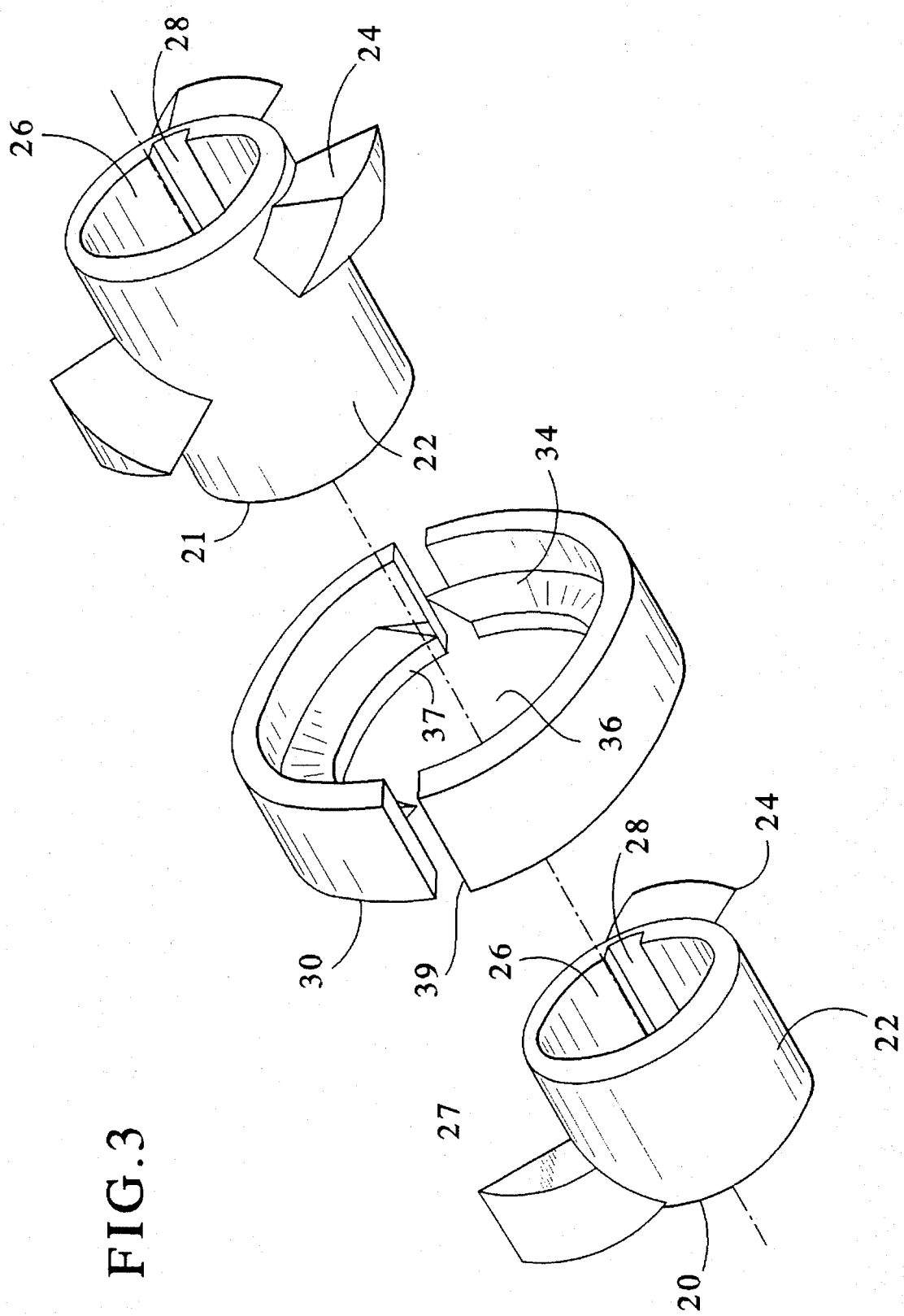
FIG. 3 is a perspective view showing the relative positioning of the elements of FIGS. 2A, 2B and 2C in the high efficiency mixer configuration.

FIG. 3 illustrates the relationship between the restriction ring assembly 30 and the on-screw elements 20 and 21 during operation. When the mixing screw 120 is turning inside the barrel 140, and reciprocating axially, the clearances between the on-screw elements 20 and 21 and the inner ring 34 provide the primary means of passage of material from one side of the restriction ring assembly 30 to the other. The on-screw element 20 on the upstream side of the restriction ring assembly includes a modified blade 27 permitting clearance of the inner ring 34. The other on-screw element 21 is placed generally downstream of the restriction ring assembly 30, and has an end blade (not visible) which moves close to and wipes the opposite surface of the inner ring 34.

The clearances between outer surfaces 22 of the on-screw elements 20 and 21 and the inner ring 34 of the restriction ring assembly 30, which can vary and preferably are on the order of 1–5 mm, determine to a large extent how much pressure build-up will occur in the upstream region of the restriction ring assembly 30 during operation of the mixer 100. It should be noted that the upstream on-screw element 20 has an L/D of about ⅓, and the downstream on-screw element 21 has an L/D of about ⅔, resulting in a total L/D of about 1.0 for the on-screw elements. The restriction ring assembly 30 has a smaller L/D of about 0.45 which coincides with the L/D of the on-screw elements 20 and 21, which engage each other but do not touch the restriction ring assembly.

Figure 4:
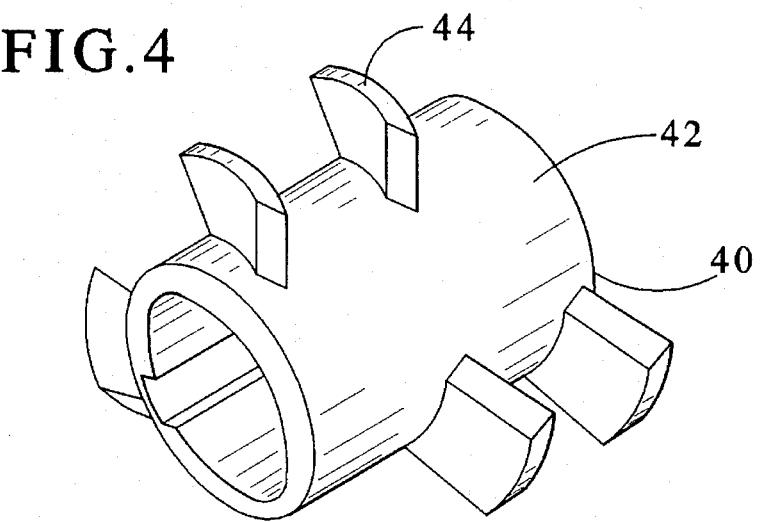
FIG. 4 is a perspective view of a low-shear mixing screw element used in the high efficiency mixer configuration.
Figure 5:
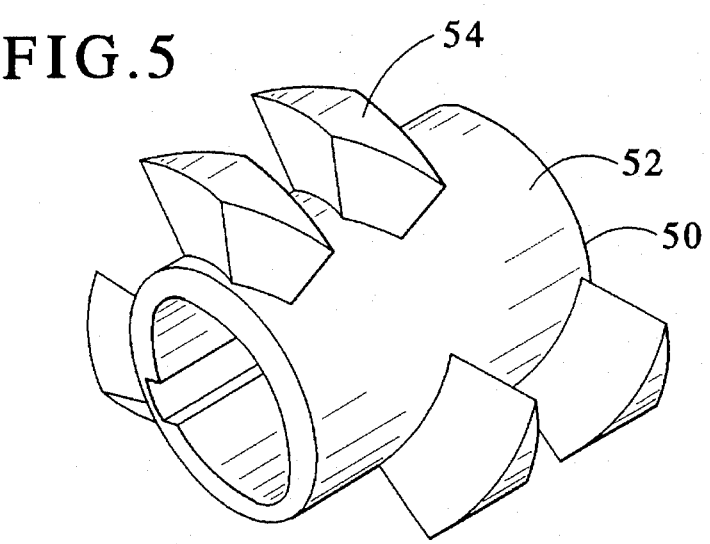
FIG. 5 is a perspective view of a high-shear mixing screw element used in the high efficiency mixer configuration.

FIGS. 4 and 5 illustrate the mixing or "kneading" elements which perform most of the mixing work. The primary difference between the lower shear mixing element 40 of FIG. 4 and the higher shear mixing element 50 of FIG. 5 is the size of the mixing blades which project outward on the mixing elements. In FIG. 5, the higher shear mixing blades 54 which project outward from the surface 52 are larger and thicker than the lower shear mixing blades 44 projecting outward from the surface 42 in FIG. 4. For each of the mixing elements 40 and 50, the mixing blades are arranged in three circumferentially-spaced rows, as explained above with respect to FIG. 1. The use of thicker mixing blades 54 in FIG. 5 means that there is less axial distance between the blades and also less clearance between the blades 54 and the stationary pins 144 as the screw 120 rotates and reciprocates axially (FIG. 1). This reduction in clearance causes inherently higher shear in the vicinity of the mixing elements 50.

Figure 6:
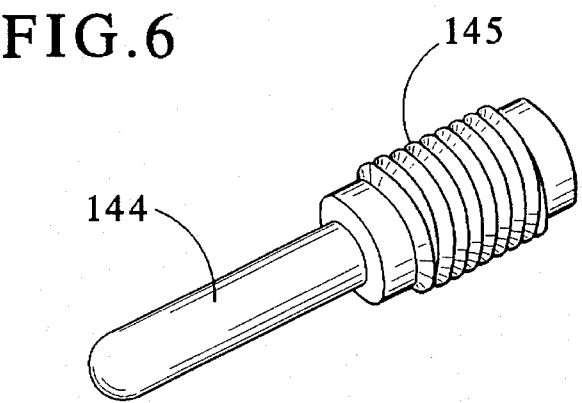
FIG. 6 is a perspective view of a barrel pin element used in the high efficiency mixer configuration.

FIG. 6 illustrates a single stationary pin 144 detached from the barrel 140. The pin 144 includes a threaded base 145 which permits attachment at selected locations along the inner barrel shaft 142. It is also possible to configure some of the pins 144 as liquid injection ports by providing them with hollow center openings.

Figure 7:
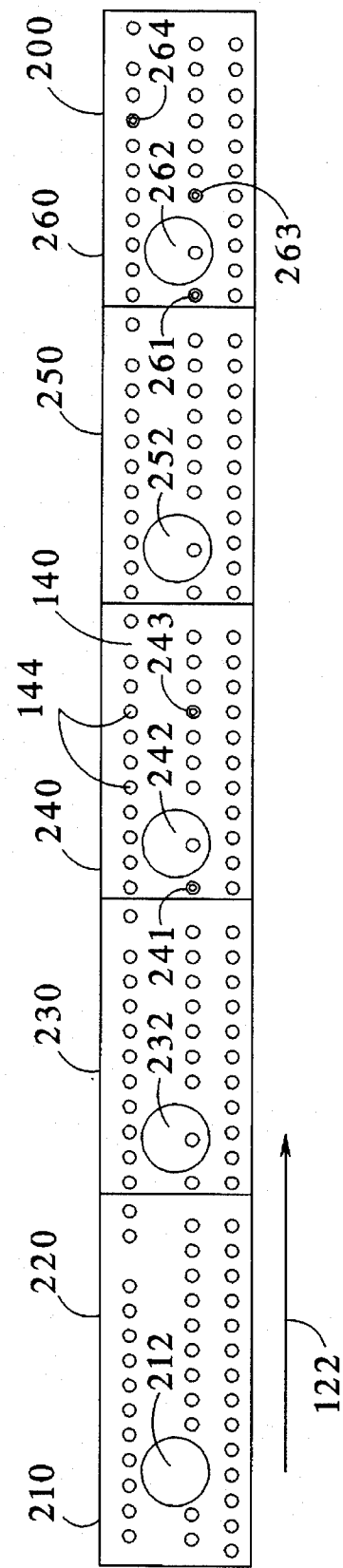
FIG. 7 is a schematic diagram of an arrangement of mixing barrel pins and ingredient feed ports.
Figure 8:
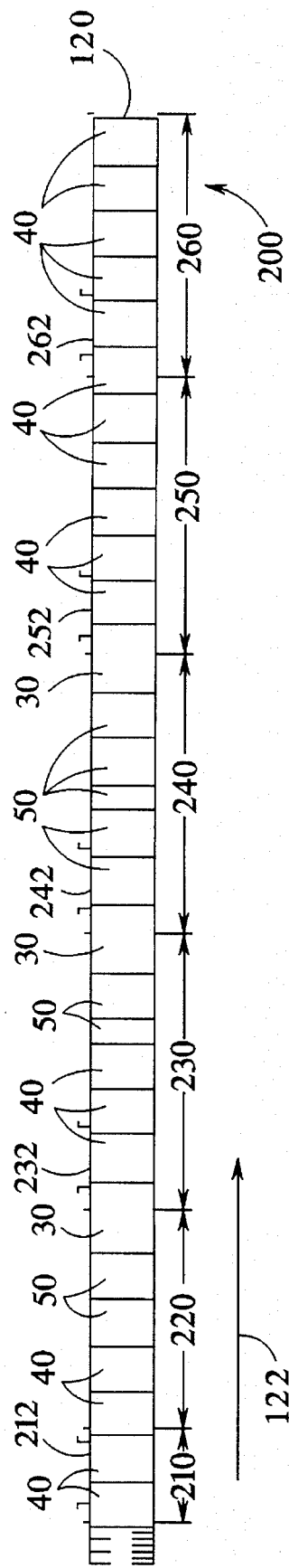
FIG. 8 is a schematic diagram of a mixing screw configuration.

FIG. 7 is a schematic view showing the presently preferred barrel configuration, including the presently preferred arrangement of barrel pins 144. FIG. 8 is a corresponding schematic view illustrating the presently preferred mixing screw configuration. The mixer 200 whose preferred configuration is illustrated in FIGS. 7 and 8 has an overall active mixing L/D of about 19.

The mixer 200 includes an initial feed zone 210 and five mixing zones 220, 230, 240, 250 and 260. The zones 210, 230, 240, 250 and 260 include five possible large feed ports 212, 232, 242, 252 and 262, respectively, which can be used to add major (e.g. solid) ingredients to the mixer 200. The zones 240 and 260 are also configured with five smaller liquid injection ports 241, 243, 261, 263 and 264 which are used to add liquid ingredients. The liquid injection ports 241, 243, 261, 263 and 264 include special barrel pins 144 formed with hollow centers, as explained above.

Referring to FIG. 7, barrel pins 144 are preferably present in most or all of the available locations, in all three rows as shown.

Referring to FIG. 8, the presently preferred configuration of the mixing screw 120 for most chewing gum products is schematically illustrated as follows. Zone 210, which is the initial feed zone, is configured with about 1⅓ L/D of low shear elements, such as the element 40 shown in FIG. 4. The L/D of the initial feed zone 210 is not counted as part of the overall active mixing L/D of 19, discussed above, because its purpose is merely to convey ingredients into the mixing zones.

The first mixing zone 220 is configured, from left to right (FIG. 8), with two low shear mixing elements 40 (FIG. 4) followed by two high shear elements 50 (FIG. 5). The two low shear mixing elements contribute about 1⅓ L/D of mixing, and the two high shear mixing elements contribute about 1⅓ L/D of mixing. Zone 220 has a total mixing L/D of about 3.0, including the end part covered by a 57 mm restriction ring assembly 30 with cooperating on-screw elements 20 and 21 (not separately designated in FIG. 8).

The restriction ring assembly 30 with cooperating on-screw elements 20 and 21, straddling the end of the first mixing zone 220 and the start of the second mixing zone 230, have a combined L/D of about 1.0, part of which is in the second mixing zone 230. Then, zone 230 is configured, from left to right, with three low shear mixing elements 40 and 1.5 high shear mixing elements 50. The three low shear mixing elements contribute about 2.0 L/D of mixing, and the 1.5 high shear mixing elements contribute about 1.0 L/D of mixing. Zone 230 has a total mixing L/D of about 4.0.

Straddling the end of the second mixing zone 230 and the start of the third mixing zone 240 is a 60 mm restriction ring assembly 30 with cooperating on-screw elements 20 and 21 having an L/D of about 1.0. Then, zone 240 is configured, from left to right, with 4.5 high shear mixing elements 50 contributing a mixing L/D of about 3.0. Zone 240 also has a total mixing L/D of about 4.0.

Straddling the end of the third mixing zone 240 and the start of the fourth mixing zone 250 is another 60 mm restriction ring assembly 30 with cooperating on-screw elements having an L/D of about 1.0. Then, the remainder of the fourth mixing zone 250 and the fifth mixing zone 260 are configured with eleven low shear mixing elements 40 contributing a mixing L/D of about 7⅓. Zone 250 has a total mixing L/D of about 4.0, and zone 260 has a total mixing L/D of about 4.0.

Before explaining where the various chewing gum ingredients are added to the continuous mixer 200, and how they are mixed, it is helpful to discuss the composition of typical chewing gums that can be made using the method of the invention. A chewing gum generally includes a water soluble bulk portion, a water insoluble chewing gum base portion, and one or more flavoring agents. The water soluble portion dissipates over a period of time during chewing. The gum base portion is retained in the mouth throughout the chewing process.

The insoluble gum base generally includes elastomers, elastomer plasticizers (resins), fats, oils, waxes, softeners and inorganic fillers. The elastomers may include polyisobutylene, isobutylene-isoprene copolymer, styrene butadiene copolymer and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax.

The gum base typically also includes a filler component such as calcium carbonate, magnesium carbonate, talc, dicalcium phosphate and the like; softeners, including glycerol monostearate and glycerol triacetate; and optional ingredients such as antioxidants, color and emulsifiers. The gum base constitutes between 5–95% by weight of the chewing gum composition, more typically 10–50% by weight of the chewing gum, and most commonly 20–30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

In accordance with the invention, the gum base and ultimate chewing gum product are made continuously in the same mixer. Generally, the gum base portion is made using a mixing L/D of about 25 or less, preferably about 20 or less, most preferably about 15 or less. Then, the remaining chewing gum ingredients are combined with the gum base to make a chewing gum product using a mixing L/D of about 15 or less, preferably about 10 or less, most preferably about 5 or less. The mixing of the gum base ingredients and the remaining chewing gum ingredients may occur in different parts of the same mixer or may overlap, so long as the total mixing is achieved using an L/D of about 40 or less, preferably about 30 or less, most preferably about 20 or less.

When the preferred blade-and-pin mixer is used, having the preferred configuration described above, the total chewing gum can be made using a mixing L/D of about 19. The gum base can be made using an L/D of about 15 or less, and the remaining gum ingredients can be combined with the gum base using a further L/D of about 5 or less.

In order to accomplish the total chewing gum manufacture using the preferred blade-and-pin mixer 200, it is advantageous to maintain the rpm of the mixing screw 120 at less than about 150, preferably less than about 100. Also, the mixer temperature is preferably optimized so that the gum base is at about 130° F. or lower when it initially meets the other chewing gum ingredients, and the chewing gum product is at about 130° F. or lower (preferably 125° F. or lower) when it exits the mixer. This temperature optimization can be accomplished, in part, by selectively heating and/or water cooling the barrel sections surrounding the mixing zones 220, 230, 240, 250 and 260.

In order to manufacture the gum base, the following preferred procedure can be followed. The elastomer, filler, and at least some of the elastomer solvent are added to the first large feed port 212 in the feed zone 210 of the mixer 200, and are subjected to highly dispersive mixing in the first mixing zone 220 while being conveyed in the direction of the arrow 122. The remaining elastomer solvent (if any) and polyvinylacetate are added to the second large feed port 232 in the second mixing zone 230, and the ingredients are subjected to a more distributive mixing in the remainder of the mixing zone 230.

Fats, oils, waxes (if used), emulsifiers and, optionally, colors and antioxidants, are added to the liquid injection ports 241 and 243 in the third mixing zone 240, and the ingredients are subjected to distributive mixing in the mixing zone 240 while being conveyed in the direction of the arrow 122. At this point, the gum base manufacture should be complete, and the gum base should leave the third mixing zone 240 as a substantially homogeneous, lump-free compound with a uniform color.

The fourth mixing zone 250 is used primarily to cool the gum base, although minor ingredient addition may be accomplished. Then, to manufacture the final chewing gum product, corn syrup, other bulk sugar sweeteners, high intensity sweeteners, and flavors can be added to the fifth mixing zone 260, and the ingredients are subjected to distributive mixing. If the gum product is to be sugarless, hydrogenated starch hydrolyzate or sorbitol solution can be substituted for the corn syrup and powdered alditols can be substituted for the sugars.

Pursuant to the present invention, at least some of the glycerin is added at an early point in the process. As used herein, the term "early point" refers to any zone in the process that is upstream of the last mixing zone. For example, in the disclosed mixer, at least a portion of the glycerin would be added before the fifth mixing zone 260.

The glycerin may either be entirely added upstream of the last mixing zone or may be split. If the glycerin addition is split, at least a portion will be added upstream of the last (fifth mixing zone 260) with the remaining glycerin being added in the last mixing zone, e.g., the fifth mixing zone 260, preferably, through injection port 261.

Sugarless gum and some sugar gums have very high levels of glycerin—maybe as high as 12%–15%. It has been found that this level of glycerin is too great to add at one point in the process. By splitting the addition of the glycerin, and adding some of the glycerin at an early point in the continuous process, sorbitol spots and phase separation can be greatly reduced if not prevented. The glycerin may also be split by forming a coevaporated syrup with hydrogenated starch hydrolysate and part of the glycerin and adding the rest into the extruder at another point in the process.

The early addition of glycerin in the continuous process allows the glycerin to be completely incorporated into the gum formula. It should also be noted that the texture of the gum during post processing and during the chew may be improved by the location of the glycerin addition.

Pursuant to the present invention, in an embodiment, at least a portion of the glycerin is injected into a 3rd or 4th mixing zone in a 5 zone gum base/chewing gum process.

Solid ingredients (bulk sweeteners, encapsulated high intensity sweeteners, etc.) are added to the large feed port 262. Syrups (corn syrup, hydrogenated starch hydrolyzate, sorbitol solution, etc.) are added to the next liquid injection port 263, and flavors are added to the final liquid injection port 264. Flavors can alternatively be added at ports 261 and 263 in order to help plasticize the gum base, thereby reducing the temperature and torque on the screw. This may permit running of the mixer at higher rpm and throughput.

The gum ingredients are compounded to a homogeneous mass which is discharged from the mixer as a continuous stream or "rope". The continuous stream or rope can be deposited onto a moving conveyor and carried to a forming station, where the gum is shaped into the desired form such as by pressing it into sheets, scoring, and cutting into sticks. Because the entire gum manufacturing process is integrated into a single continuous mixer, there is less variation in the product, and the product is cleaner and more stable due to its simplified mechanical and thermal histories.

A wide range of changes and modifications to the preferred embodiments of the invention will be apparent to persons skilled in the art. The above preferred embodiments, and the examples which follow, are merely illustrative of the invention and should not be construed as imposing limitations on the invention. For instance, different continuous mixing equipment and different mixer configurations can be used without departing from the invention as long as the preparation of a chewing gum base and chewing gum product are accomplished in a single continuous mixer using a mixing L/D of not more than about 40.

EXAMPLE 1

Testing The Suitability Of A Continuous Mixer

The following preliminary test can be employed to determine whether a particular continuous mixer with a particular configuration meets the requirements of a high efficiency mixer suitable for practicing the method of the invention.

A dry blend of 35.7% butyl rubber (98.5% isobutylene—1.5% isoprene copolymer, with a molecular weight of 120,000–150,000, manufactured by Polysar, Ltd. of Sarnia, Ontario, Canada as POLYSAR Butyl 101-3); 5.7% calcium carbonate (VICRON 15-15 from Pfizer, Inc., New York, N.Y.); 14.3% polyterpene resin (ZONAREZ 90 from Arizona Chemical Company of Panama City, Fla.) and 14.3% of a second polyterpene resin (ZONAREZ 7125 from Arizona Chemical Company) is fed into the continuous mixer in question equipped with the mixer configuration to be tested. The temperature profile is optimized for the best mixing, subject to the restriction that the exit temperature of the mixture does not exceed 170° C. (and preferably remains below 160° C.) to prevent thermal degradation. In order to qualify as a suitable high efficiency mixer, the mixer should produce a substantially homogeneous, lump-free compound with a uniform milky color in not more than about 10 L/D, preferably not more than about 7 L/D, most preferably not more than about 5 L/D.

To thoroughly check for lumps, the finished rubber compound may be stretched and observed visually, or compressed in a hydraulic press and observed, or melted on a hot plate, or made into a finished gum base which is then tested for lumps using conventional methods.

Also, the mixer must have sufficient length to complete the manufacture of the gum base, and of the chewing gum product, in a single mixer, using a total mixing L/D of not more than about 40. Any mixer which meets these requirements falls within the definition of a high-efficiency mixer suitable for practicing the method of the invention.

EXAMPLES 2–11

Continuous Chewing Gum Manufacture

The following examples were run using a Buss kneader with a 100 mm mixer screw diameter, configured in the preferred manner described above (unless indicated otherwise), with five mixing zones, a total mixing L/D of 19, and an initial conveying L/D of 1⅓. No die was used at the end of the mixer, unless indicated otherwise, and the product mixture exited as a continuous rope. Each example was designed with feed rates to yield chewing gum product at the rate of 300 pounds per hour.

Liquid ingredients were fed using volumetric pumps into the large feed ports and/or smaller liquid injection ports generally positioned as described above, unless otherwise indicated. The pumps were appropriately sized and adjusted to achieve the desired feed rates.

Dry ingredients were added using gravimetric screw feeders into the large addition ports positioned as described above. Again, the feeders were appropriately sized and adjusted to achieve the desired feed rates.

Temperature control was accomplished by circulating fluids through jackets surrounding each mixing barrel zone and inside the mixing screw. Water cooling was used where temperatures did not exceed 200° F., and oil cooling was used at higher temperatures. Where water cooling was desired, tap water (typically at about 57° F.) was used without additional chilling.

Temperatures were recorded for both the fluid and the ingredient mixture. Fluid temperatures were set for each barrel mixing zone (corresponding to zones 220, 230, 240, 250 and 260 in FIGS. 7 and 8), and are reported below as Z1, Z2, Z3, Z4 and Z5, respectively. Fluid temperatures were also set for the mixing screw 120, and are reported below as S1.

Actual mixture temperatures were recorded near the downstream end of mixing zones 220, 230, 240 and 250; near the middle of mixing zone 260; and near the end of mixing zone 260. These mixture temperatures are reported below as T1, T2, T3, T4, T5 and T6, respectively. Actual mixture temperatures are influenced by the temperatures of the circulating fluid, the heat exchange properties of the mixture and surrounding barrel, and the mechanical heating from the mixing process, and often differ from the set temperatures due to the additional factors.

All ingredients were added to the continuous mixer at ambient temperature (about 77° F.) unless otherwise noted.

EXAMPLE 2

This example illustrates the preparation of a spearmint flavored non-tack sugar chewing gum. A mixture of 24.2% terpene resin, 29.7% dusted ground butyl rubber (75% rubber with 25% fine ground calcium carbonate as an anti-blocking aid) and 46.1% fine ground calcium carbonate was fed at 25 lb/hr into the first large feed port (port 212 in FIGS. 7 and 8). Low molecular weight polyisobutylene (mol. wt.=12,000), preheated to 100° C., was also added at 6.3 lb/hr into this port.

Ground low molecular weight polyvinyl acetate was added at 13.3 lb/hr into the second large feed port (port 232 in FIGS. 7 and 8).

A fat mixture, preheated to 83° C., was injected into the liquid injection ports in the third mixing zone (ports 241 and 243 in FIG. 7), at a total rate of 18.4 lb/hr, with 50% of the mixture being fed through each port. The fat mixture included 30.4% hydrogenated soybean oil, 35.4% hydrogenated cottonseed oil, 13.6% partially hydrogenated soybean oil, 18.6% glycerol monostearate, 1.7% cocoa powder, and 0.2% BHT.

Glycerin was injected into the first liquid injection port in the fifth mixing zone (port 261 in FIG. 7) at 3.9 lb/hr. A mixture of 1.1% sorbitol and 98.9% sugar was added into the large feed port in the fifth mixing zone (port 262 in FIG. 7) at 185.7 lb/hr. Corn syrup, preheated to 44° C., was added into the second liquid injection port in the fifth mixing zone (port 263 in FIG. 7) at 44.4 lb/hr. Spearmint flavor was added into the third liquid injection port in the fifth mixing zone (port 264 in FIG. 7) at 3.0 lb/hr.

The zone temperatures Z1–Z5 were set (in °F.) at 350, 350, 150, 57 and 57, respectively. The mixing screw temperature S1 was set at 120° F. The mixture temperatures T1–T6 were measured at steady state (in °F.) as 235, 209, 177, 101 and 100, and fluctuated slightly during the trial. The screw rotation was 80 rpm.

The chewing gum product exited the mixer at 120° F. The product was comparable to that produced by conventional pilot scale batch processing. The chew was slightly rubbery but no base lumps were visible.

EXAMPLE 3

This example illustrates the preparation of a peppermint flavored non-tack sugar chewing gum. A dry mixture of 57% dusted ground butyl rubber (75% rubber, 25% calcium carbonate) and 43% fine ground calcium carbonate was added at the first large feed port 212 (FIG. 7), at 13.9 lb/hr.

Molten polyisobutylene (preheated to 100° C.) was also added to port 212 at 9.5 lb/hr.

Ground low molecular weight polyvinyl acetate was added to port 232 at 13.0 lb/hr.

A fat mixture (preheated to 82° C.) was pumped 50/50 into ports 241 and 243 at a total rate of 23.6 lb/hr. The fat mixture included 33.6% hydrogenated cottonseed oil, 33.6% hydrogenated soybean oil, 24.9% partially hydrogenated soybean oil, 6.6% glycerol monostearate, 1.3% cocoa powder and 0.1% BHT. Glycerin was added to port 261 at 2.1 lb/hr. A mixture of 98.6% sugar and 1.4% sorbitol was added to port 262 at 196 lb/hr. Corn syrup (preheated to 40° C.) was added to port 263 at 39.9 lb/hr. Peppermint flavor was added to port 264 at 2.1 lb/hr.

The zone temperatures (Z1–Z5, °F.) were set at 350, 350, 300, 60 and 60, respectively. The screw temperature (S1) was set at 200° F. The mixture temperatures (T1–T6, °F.) were measured as 297, 228, 258, 122, 98 and 106, respectively. The screw rotation was 85 rpm.

The chewing gum product exited the mixer at 119° F. The finished product was free of lumps but was dry and lacked tensile strength. These defects were attributed to the formula rather than the processing.

EXAMPLE 4

This example illustrates the preparation of a spearmint flavored gum for pellet coating. A blend of 27.4% high molecular weight terpene resin, 26.9% low molecular weight terpene resin, 28.6% dusted ground butyl rubber (75% rubber, 25% calcium carbonate) and 17.1% fine ground calcium carbonate was fed into the first large port 212 (FIG. 7), at 33.5 lb/hr. Molten polyisobutylene (100° C.) was pumped into the same port at 1.3 lb/hr.

Low molecular weight polyvinyl acetate was fed to port 232 at 19.8 lb/hr.

A fat mixture (82° C.) was added 50/50 into ports 241 and 243, at a total rate of 17.4 lb/hr. The fat mixture included 22.6% hydrogenated cottonseed oil, 21.0% partially hydrogenated soybean oil, 21.0% hydrogenated soybean oil, 19.9% glycerol monostearate, 15.4% lecithin and 0.2% BHT.

Sugar was fed into port 262 at 157.8 lb/hr. Corn syrup (40° C.) was added to port 263 at 68.4 lb/hr. Spearmint flavor was added to port 264 at 1.8 lb/hr.

The zone temperatures (Z1–Z5, °F.) were set at 160, 160, 110, 60 and 60, respectively. The screw temperature (S1) was set at 68° F. The mixture temperatures (T1–T6, °F.) were measured as 230, 215, 166, 105, 109 and 111, respectively. The screw rotation was 80 rpm.

The chewing gum product exited the mixer at 121° F. The product was firm and cohesive when chewed (normal for a pellet center). No base lumps were visible.

EXAMPLE 5

This example illustrates the preparation of a peppermint flavored sugar chewing gum. A blend of 24.4% dusted ground butyl rubber (75% rubber, 25% calcium carbonate), 18.0% low molecular weight terpene resin, 18.3% high molecular weight terpene resin and 39.4% fine ground calcium carbonate was added to the first large port 212 (FIG. 7) at 27.6 lb/hr.

A blend of 11.1% high molecular weight polyvinyl acetate and 88.9% low molecular weight polyvinyl acetate was added into the second large feed port 232 at 14.4 lb/hr.

Polyisobutylene (preheated to 100° C.) was also added to this port at 3.5 lb/hr.

A fat mixture (83° C.) was added 50/50 into ports 241 and 243, at a total rate of 14.5 lb/hr. This fat mixture included 31.9% hydrogenated cottonseed oil, 18.7% hydrogenated soybean oil, 13.2% partially hydrogenated cottonseed oil, 19.8% glycerol monostearate, 13.7% soy lecithin, 2.5% cocoa powder and 0.2% BHT.

Glycerin was injected into port 261 at 3.9 lb/hr. A mixture of 84.6% sucrose and 15.4% dextrose monohydrate was added to port 262 at 203.1 lb/hr. Corn syrup (40° C.) was injected into port 263 at 30.0 lb/hr. A mixture of 90% peppermint flavor and 10% soy lecithin was injected into port 264 at 3.0 lb/hr.

The zone temperatures (Z1–Z5, °F.) were set at 350, 350, 100, 60 and 60, respectively, and the screw temperature (S1) was set at 100° F. The mixture temperatures (T1–T6, °F.) were measured as 308, 261, 154, 95, 94 and 105, respectively. The screw rotation was set at 55 rpm.

The product exited the mixer at 127° F. The finished product had good chew characteristics and there was no evidence of rubber lumps.

EXAMPLE 6

This example illustrates the preparation of a fruit-flavored sugar gum. A mixture of 39.3% dusted ground butyl rubber (75% rubber, 25% calcium carbonate), 39.1% low molecular weight terpene resin and 21.6% fine ground calcium carbonate was added to the first large feed port 212 (FIG. 7) at 20.6 lb/hr.

A mixture of 33.0% low molecular weight terpene resin and 67.0% low molecular weight polyvinyl acetate was added at 24.4 lb/hr into the second large feed port 232. Polyisobutylene (preheated to 100° C.) was also added at 1.0 lb/hr into the port 232.

A fat/wax composition (82° C.) was injected 50/50 into the liquid injection ports 241 and 243, at a total rate of 14.0 lb/hr. The composition included 29.7% paraffin wax, 21.7% microcrystalline wax (m.p.=170° F.), 5.7% microcrystalline wax (m.p.=180° F.), 20.5% glycerol monostearate, 8.6% hydrogenated cottonseed oil, 11.4% soy lecithin, 2.1% cocoa powder, and 0.3% BHT.

Glycerin was injected into the liquid injection port 261 at 3.3 lb/hr. A mixture of 88.5% sucrose and 11.5% dextrose monohydrate was added at 201.0 lb/hr into the large port 262. Corn syrup (40° C.) was injected at 3.0 lb/hr into the liquid injection port 263, and a mixture of 88.9% fruit flavor and 11.1% soy lecithin was injected at 2.7 lb/hr into the liquid injection port 264.

The zone temperatures (Z1–Z5, °F.) were set at 425, 425, 200, 61 and 61, respectively. The screw temperature (S1) was set at 66° F. The mixture temperatures (T1–T6, °F.) were measured as 359, 278, 185, 105, 100 and 109, respectively. The screw rotation was set at 70 rpm.

The chewing gum product exited the mixer at 122° F. The product was very soft while warm and fell apart during chewing. However, this was not atypical for this product. After aging for two months, the product was again chewed and found to have excellent texture and flavor. No rubber lumps were visible.

EXAMPLE 7

This example illustrates the preparation of a sugar chunk bubble gum. For this example, the mixer configuration was varied slightly from the preferred configuration described above and used for Examples 2–6. Specifically, a round-hole 30 mm die was installed at the exit end of the mixer.

A blend of 68.9% high molecular weight polyvinyl acetate and 31.1% ground talc was added into the first large feed port 212 (FIG. 7), at 35.4 lb/hr. Polyisobutylene (preheated to 100° C.) was also added to port 212 at 3.95 lb/hr. Further downstream, in the first mixing zone 220, acetylated monoglyceride was injected at 2.6 lb/hr, using a liquid injection (hollow barrel pin) port not shown in FIG. 7.

Additional polyisobutylene (100° C.) at 3.95 lb/hr, and glycerol ester of partially hydrogenated wood rosin at 13.4 lb/hr, were added into the second large port 232. A mixture of 43.6% glycerol monostearate, 55.9% triacetin and 0.5% BHT was added at 6.7 lb/hr into the liquid injection port 241.

Glycerin was injected at 2.1 lb/hr into the liquid injection port 261. A mixture of 98.4% sucrose and 1.6% citric acid was added at 170.4 lb/hr into the large port 262. Corn syrup (40° C.) was injected at 58.5 lb/hr into liquid injection port 263, and a mixture of 60% lemon-lime flavor and 40% soy lecithin was added at 3.0 lb/hr into the liquid injection port 264.

The zone temperatures (Z1–Z5, °F.) were ultimately set at 440, 440, 160, 61 and 61, respectively. The screw temperature (S1) was ultimately set at 80° F. The mixture temperatures (T1–T6, °F.) were ultimately measured as 189, 176, 161, 97, 108 and 112, respectively. The screw rotation was 55 rpm.

At first, the product exited the extruder at 140° F. and exhibited signs of heat stress. The zone temperatures Z1 and Z2 were then reduced by 10° F. each, and the screw temperature S1 was raised by 20° F., to the values shown above. This caused the chewing gum exit temperature to drop to 122° F., and the product quality improved markedly.

During chewing, the product exhibited excellent texture, flavor, and bubble blowing characteristics. No rubber lumps were visible.

EXAMPLE 8

This example illustrates the preparation of a spearmint flavored sugarless gum. A mixture of 42.1% fine ground calcium carbonate, 18.9% glycerol ester of wood rosin, 16.7% glycerol ester of partially hydrogenated wood rosin, 17.0% ground butyl rubber, and 5.3% dusted ground (25:75) styrene butadiene rubber (75% rubber, 25% calcium carbonate) was added into port 212 (FIG. 7) at 38.4 lb/hr.

Low molecular weight polyvinyl acetate at 12.7 lb/hr, and polyisobutylene (preheated to 100° C.) at 7.6 lb/hr, were added into port 232.

A fat mixture (82° C.) was injected 50/50 into ports 241 and 243, at a total rate of 20.9 lb/hr. The fat mixture included 35.7% hydrogenated cottonseed oil, 30.7% hydrogenated soybean oil, 20.6% partially hydrogenated soybean oil, 12.8% glycerol monostearate and 0.2% BHT.

Unlike the previous examples, glycerin was injected at 25.5 lb/hr into the fourth mixing zone 250 (FIG. 7) through a liquid injection port (not shown). A coevaporated blend of hydrogenated starch hydrolysate and glycerin (at 40° C.) was injected further downstream in the fourth mixing zone 250 through another liquid injection port (not shown). The coevaporated blend included 67.5% hydrogenated starch hydrolysate solids, 25% glycerin and 7.5% water.

A mixture of 84.8% sorbitol, 14.8% mannitol and 0.4% encapsulated aspartame was added into port 262 in the fifth mixing zone 260, at 162.3 lb/hr. A mixture of 94.1% spearmint flavor and 5.9% lecithin was injected at 5.1 lb/hr into the port 264 located further downstream.

The zone temperatures (Z1–Z5, °F.) were set at 400, 400, 150, 62 and 62, respectively. The screw temperature (S1) was set at 66° F. The mixture temperatures (T1–T6, °F.) were measured as 307, 271, 202, 118, 103 and 116. The mixing screw rotation was 69 rpm.

The chewing gum product exited the mixer at 117° F. The gum had good appearance with no sorbitol spots or rubber lumps. The gum was slightly wet to the touch, sticky and fluffy (low density), but was acceptable. During chewing, the gum was considered soft initially but firmed up with continued chewing.

EXAMPLE 9

This example illustrates the preparation of a sugarless spearmint gum for use in coated pellets. A mixture of 28.6% dusted ground butyl rubber (75% rubber, 25% calcium carbonate), 27.4% high molecular weight terpene resin, 26.9% low molecular weight terpene resin and 17.1% calcium carbonate was added into port 212 (FIG. 7) at 41.9 lb/hr.

Low molecular weight polyvinyl acetate at 24.7 lb/hr, and polyisobutylene (preheated to 100° C.) at 1.7 lb/hr, were added into port 232.

A fat composition (82° C.) was injected 50/50 into ports 241 and 243 at a total rate of 21.7 lb/hr. The fat composition included 22.6% hydrogenated cottonseed oil, 21.0% hydrogenated soybean oil, 21.0% partially hydrogenated soybean oil, 19.9% glycerol monostearate, 15.4% glycerin and 0.2% BHT.

A 70% sorbitol solution was injected into the fourth mixing zone 250 (FIG. 7) at 17.4 lb/hr, using a hollow barrel pin liquid injection port (not shown).

A mixture of 65.8% sorbitol, 17.9% precipitated calcium carbonate and 16.3% mannitol was added at 184.2 lb/hr into the final large port 262. A mixture of 71.4% spearmint flavor and 28.6% soy lecithin was added at 8.4 lb/hr into the final liquid injection port 264.

The zone temperatures (Z1–Z5, °F.) were set at 400, 400, 150, 61 and 61, respectively. The screw temperature (S1) was set at 65° F. The mixture temperatures (T1–T6, °F.) were measured as 315, 280, 183, 104, 109 and 116, respectively. The screw rotation was set at 61 rpm.

The chewing gum exited the mixer at 127° F. The product appearance was good with no sorbitol spots or rubber lumps. However, the initial chew was reported as being rough and grainy.

EXAMPLE 10

This example illustrates the preparation of a peppermint flavored sugar chewing gum. A mixture of 27.4% dusted ground butyl rubber (75% butyl rubber dusted with 25% calcium carbonate), 14.1% lower softening terpene resin (softening point=85° C.), 14.4% higher softening terpene resin (softening point=125° C.) and 44.1% calcium carbonate was fed at 24.6 lb/hr into the first large feed port (port 212 in FIGS. 7 and 8).

A mixture of 73.5% low molecular weight polyvinyl acetate, 9.2% high molecular weight polyvinyl acetate, 8.6 lower softening terpene resin and 8.7% higher softening terpene resin was fed at 17.4 lb/hr into the second large feed port 232. Polyisobutylene was also added at 3.5 lb/hr into this port.

A fat mixture, preheated to 83° C., was injected into the liquid injection ports in the third mixing zone (ports 241 and 243 in FIG. 7), at a total rate of 14.5 lb/hr, with 50% of the mixture being fed through each port. The fat mixture included 0.2% BHT, 2.5% cocoa powder, 31.9% hydrogenated cottonseed oil, 19.8% glycerol monostearate, 18.7% hydrogenated soybean oil, 13.7% lecithin, and 13.2% partially hydrogenated cottonseed oil.

A mixture of 84.6% sugar and 15.4% dextrose monohydrate was injected at 203.1 lb/hr into the large feed port 262 in the fifth mixing zone. Glycerin was added at 3.9 lb/hr into the first liquid injection port 261 in the fifth mixing zone. Corn syrup, preheated to 44° C., was added at 30.0 lb/hr into the second liquid injection port 263 in the fifth mixing zone. A mixture of 90.0% peppermint flavor and 10.0% lecithin was injected into the third liquid injection port 264 in the fifth mixing zone at 3.0 lb/hr.

The zone temperatures Z1–Z5 were set (in °F.) at 350, 350, 110, 25 and 25, respectively. The mixing screw temperature S1 was set at 101° F. The mixer temperatures T1–T6 were measured at steady state (in °F.) as 320, 280, 164, 122, 105 and 103, respectively. The screw rotation was 63 rpm, and the product exited the mixer at 52°–53° C.

The peppermint sugar gum product was desirably soft, and acceptable in quality.

EXAMPLE 11

This example illustrates the preparation of a sugarless stick bubble gum. For this example, the screw configuration shown in FIG. 8, and used for the previous examples, was varied as follows. The conveying section 210 and mixing sections 220, 250 and 260 were configured substantially as before. In the second mixing zone 230, the three low shear elements 40 were also not changed.

Thereafter, the 1½ high shear elements 50 in zone 230, the restriction element 30 overlapping zones 230 and 240, all of zone 240, and the restriction element 30 overlapping zones 240 and 250 were removed. Three high shear elements 50 (combined L/D=2.0) were placed in zone 230 and extended into zone 240. Two and one-half low shear elements 40 (combined L/D=1⅔) followed in zone 240. Then, three and one-half high shear elements 50 (combined L/D=2⅓) followed in zone 240 and extended into zone 250. The eleven low-shear elements 40 in zones 250 and 260 were not changed.

To make the product, a mixture of 53.3% high molecular weight polyvinyl acetate, 31.0% talc, 12.2% glycerol ester of wood rosin and 3.5% dusted ground (25:75) styrene-butadiene rubber (75% rubber, 25% calcium carbonate) were fed into the large port 212 (FIG. 7) at 54.9 lb/hr. Polyisobutylene (preheated to 100° C.) was pumped into the same port at 9.0 lb/hr.

Glycerol ester of partially hydrogenated wood rosin at 15.3 lb/hr, and triacetin at 4.4 lb/hr, were added into the large port 232 in the second mixing zone 230.

A fat/wax mixture (at 82° C.) was fed 50/50 into the liquid injection ports 241 and 243 in the third mixing zone 240, at a total rate of 13.9 lb/hr. The mixture included 50.3% glycerol monostearate, 49.4% paraffin (m.p.=135° F.) and 0.3% BHT.

Diluted glycerin was injected into the fourth mixing zone 250 at 28.2 lb/hr using a liquid injection port (not shown). The dilution was 87% glycerin and 13% water.

A mixture of 84.0% sorbitol, 12.7% mannitol, 1.1% fumaric acid, 0.2% aspartame, 0.4% encapsulated aspartame, 0.7% adipic acid and 0.9% citric acid was fed into port 262 in the fifth mixing zone 260 at 165.0 lb/hr. A mixture of 51.6% bubble gum flavor and 48.4% soy lecithin was injected into port 264 in zone 260 at 9.3 lb/hr.

The zone temperatures (Z1–Z5, °F.) were set at 350, 350, 100, 64 and 64, respectively. The screw temperature (S1) was set at 100° F. The mixture temperatures (T1–T6, °F.) were recorded as 286, 260, 163, 107, 104 and 112, respectively. The screw rotation was 75 rpm.

The chewing gum exited the mixer at 118° F. The finished product looked good and contained no base lumps. The flavor and texture were very good during chewing, as were the bubble blowing characteristics.

By way of example and not limitation, Examples 12–15 illustrate examples of the present invention using the early and/or split addition of glycerin.

EXAMPLE 12

This example illustrates the preparation of a sugarless bubble gum where the glycerin is added in the fourth mixing zone.

A mixture of 31.1% fine ground calcium carbonate, and 68.9% polyvinyl acetate was fed at 35.4 lb/hrs into the first large feed port. Acetylated monoglycerides were injected into the first mixing zone at 2.6 lb/hr.

Low molecular weight polyisobutylene was added at 7.9 lb/hr into the second large feed port. In addition, glycerol ester of hydrogenated rosin was added into second large feed port at 13.4 lb/hr.

An oil mixture was injected into the third mixing zone at a total rate of 6.7 lb/hr. The oil mixture included 43.6% glycerol monostearate oil, 55.9% glycerol triacetate and 0.50% BHT.

Glycerin was injected through a pin into the fourth mixing zone at 24.1 lb/hr.

A dry blend of 86.9% sorbitol and 13/1% mannitol was added into the third large feed port at 154.3 lb/hr.

A mixture of 51.6% flavor and 48.4% lecithin was added into the fifth mixing zone by injection at 8.6 lb/hr.

This produced a total output of approximately 253 lb/hr from the extruder.

The temperatures Z1–Z5 were set at 450°, 450°, 160°, 50° and 50° F. The mixture temperatures were measured at 210°, 190°, 166°, 107°, 111°, and 119° F. The mixing screw temperature was set to 60° F. and the screw rotation was 70 rpm.

There were very small sorbitol spots found in the finished gum product but they were very infrequent and the gum was still considered acceptable.

EXAMPLE 13

This example illustrates the preparation of a sugarless spearmint chewing gum. In this example there were two points of addition of the glycerin. The first point of addition is as part of a coevaporated glycerin/hydrogenated starch hydrolysate syrup and the second point is injected alone.

A mixture of 18.9% glycerol ester of wood rosin, 16.7% glycerol ester of hydrogenated rosin, 5.3% ground butadiene-styrene, 17.0 % ground butyl rubber, and 42.1% fine ground calcium carbonate was fed at 38.4 lb/hr into the first large feed port.

Low molecular weight polyisobutylene (mol. wt.=12, 000), preheated to 100° C., was added into the second large feed port at 7.6 lb/hr. Ground low molecular weight polyvinyl acetate was also added at 12.7 lb/hr into the second large feed port.

A fat mixture was injected into the third mixing zone, at a total rate of 20.9 lb/hr. The fat mixture included 35.7% hydrogenated cottonseed oil, 30.7% hydrogenated soy bean oil, 12.8% glycerol monostearate, 20.6% partially hydrogenated vegetable oil and 0.2% BHT.

A coevaporated sugarless syrup containing 25% glycerin, 7.5% water and 67.5% hydrogenated starch hydrolysate was injected into the fourth mixing zone at 27.6 lb/hr. Glycerin was also injected into the fourth mixing zone at 25.5 lb/hr.

A dry blend of 84.8% sorbitol powder, 14.8% mannitol and 0.4% encapsulated aspartame were added into the fifth mixing zone at 162.3 lb/hr.

A mixture of 94.1% flavor and 5.9% lecithin was added into the fifth mixing zone by injecting at 5.1 lb/hr.

This produced a total output of approximately 300.1 lb/hr from the extruder.

The zone temperatures Z1–Z5 were set 400°, 400°, 150°, 50°, and 50° F. The mixture temperatures T1–T6 were measured at 305°, 284°, 174°, 102°, 99° and 106° F. The screw temperature was set to 50 C. and the screw rotation was 70 rpm.

No sorbitol spots or rubber lumps were found in the finished product. The gum was very fluffy and had low density and was found acceptable.

EXAMPLE 14

This example illustrates the preparation of a sugarless bubble gum where the glycerin is added in the fourth mixing zone.

A mixture of 12.2% glycerol ester of wood rosin, 3.5% ground butadiene-styrene, 31.0% fine ground calcium carbonate, and 53.3% polyvinyl acetate was fed at 54.9 lb/hr into the first large feed port.

Low molecular weight polyisobutylene was added at 9.0 lb/hr into the second large feed port. Glycerol ester of hydrogenated rosin was also added at 15.3 lb/hr.

An oil mixture was injected into the liquid injection ports in the third mixing zone at a total rate of 13.9 lb/hr. The mixture included 50.29% glycerol monostearate, 49.4% paraffin wax, 0.31% BHT. Glycerol triacetate was also added at 4.4 lb/hr.

A mixture of 92.5% glycerin and 7.5% water was added at 28.2 lb/hr into the fourth mixing zone.

A dry blend of 84.0% sorbitol, 12.7% mannitol, 2.7% acids, and 0.6% encapsulated sweeteners were added into the third large feed port into the mixing zone at 165 lb/hr. A mixture of 51.6% flavor and 48.4% lecithin was also added into the fifth mixing zone by injection at 9.3 lb/hr.

This produced a total output of approximately 300.0 lb/hr from the extruder.

The zone temperatures Z1–Z5 were set at 300°, 300°, 250°, 50°, and 50° F. respectively. The mixing screw temperature was set at 50° F. The mixture temperatures T1–T6 were measured at 278°, 257°, 204°, 115°, 110°, and 118° F. The screw rotation was 100 rpm.

The finished product was very soft, tacky, and there were numerous sorbitol spots found. It was decided to split the resin addition 40/60 into zones 1 and 2 respectively.

EXAMPLE 15

This example illustrates the preparation of a sugarless chewing gum where the terpene resin is split 40/60% between zones 1 and 2 and the glycerin is added early into the fourth mixing zone.

A mixture of 11.5% glycerol ester of wood rosin, 9.8% glycerol ester of hydrogenated rosin, 3.3% ground butadiene-styrene, 47.5% polyvinyl acetate, 27.9% fine ground calcium carbonate, was fed at 61.02 lb/hr into the first large feed port.

Low molecular weight polyisobutylene was added into the second large fed port at 9.0 lb/hr. Glycerol ester of hydrogenated rosin was also added at 9.18 lb/hr.

An oil mixture was injected into the liquid injection ports in the third mixing zone at a total rate of 13.9 lb/hr. The oil mixture included 50.29% glycerol monostearate, 49.4% paraffin wax, and 0.31% BHT. Glycerol triacetate was also added at 4.4 lb/hr.

A mixture of 92.5% glycerin and 7.5% water was injected into the fourth mixing zone at 28.2 lb/hr.

A dry blend of 84% sugar, 12.7% mannitol, 2.7% acids, and 0.6% aspartame was added into the fifth mixing zone at 165 lb/hr. A preblend of 48.4% flavor and 51.6% lecithin was then injected into the fifth mixing zone at 9.3 lb/hr.

This produced a total output of approximately 300 lb/hr from the

The zone temperatures Z1–Z5 were set at 300°, 300°, 250°, 50°, and 50° F. respectively. temperature was set at 50° F. The mixture temperatures T1–T6 were measured at 277°, 271°, 202°, 188°, 103°, and 106° F. The screw rotation was 90 rpm.

In summary, the foregoing examples indicate that the method of the invention can be used to prepare a wide variety of good quality chewing gum products in a single continuous mixer. This method is expected to save manufacturing time and money, and improve the product consistency and quality.

It should be appreciated that the method of the present invention is capable of being incorporated in the form of a variety of embodiments, only a few of which have been illustrated and described above. The invention may be embodied in other forms without departing from its spirit or essential characteristics. It will be appreciated that the addition of certain other ingredients, process steps, materials or components not specifically included will have an adverse impact may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A method of continuously manufacturing chewing gum in a mixer including at least two mixing zones comprising the steps of:
    a) adding gum base to a high efficiency continuous mixer;
    b) adding at least one sweetener and at least one flavor into the continuous mixer;
    c) adding glycerin to the mixer wherein at least some of the glycerin is added upstream of the final mixing zone of the mixer; and
    d) mixing the ingredients to form a chewing gum product.

2. The method of claim 1 wherein at least some glycerin is added as a syrup with another ingredient.

3. The method of claim 1 wherein at least some of the glycerin is added as a co-evaporated syrup.

4. The method of claim 1 wherein at least some of the glycerin is added as a co-evaporated syrup with hydrogenated starch.

5. A chewing gum product manufactured according to the method of claim 1.

6. The method of claim 1 wherein the mixer includes at least three mixing zones.

7. A method of continuously manufacturing chewing gum without requiring separate manufacture of a chewing gum base, comprising the steps of:
    a) adding at least an elastomer and filler into a high efficiency continuous mixer;
    b) adding at least one sweetener and at least one flavoring agent into the elastomer and filler in the continuous mixer;
    c) adding glycerin to the continuous mixer, at least some of the glycerin being added at an early point in the mixer; and
    d) continuously discharging the chewing gum product from the mixer.

8. The method of claim 7 wherein at least some glycerin is added as a syrup with another ingredient.

9. The method of claim 7 wherein at least some of the glycerin is added as a co-evaporated syrup.

10. The method of claim 7 wherein at least some of the glycerin is added as a co-evaporated syrup with hydrogenated starch.

11. The method of claim 7 wherein the continuous mixer includes at least 5 mixing zones.

12. A chewing gum product manufactured according to the method of claim 7.

13. A method of continuously manufacturing chewing gum comprising the steps of:
    a) adding gum base ingredients to a continuous mixer;
    b) adding at least one sweetener and at least one flavor into the mixer; and
    c) adding glycerin into the mixer, the glycerin being added at at least two separate locations in the mixer.

14. The method of claim 13 wherein the gum base ingredients are added to the mixer as a finished gum base product.

15. The method of claim 13 wherein at least some glycerin is added as a syrup with another ingredient.

16. The method of claim 13 wherein at least some of the glycerin is added as a co-evaporated syrup.

17. The method of claim 13 wherein at least some of the glycerin is added as a co-evaporated syrup with hydrogenated starch.

18. A chewing gum product manufactured according to the method of claim 13.

19. A method of manufacturing chewing gum comprising the steps of:
    adding chewing gum ingredients to a continuous mixer;
    adding glycerin to the continuous mixer, continuously mixing the chewing gum ingredients and glycerin to process chewing gum;
    wherein the glycerin is added at an early point in the continuous mixing process.

* * * * *